United States Patent
Lopez et al.

(10) Patent No.: US 8,927,044 B2
(45) Date of Patent: Jan. 6, 2015

(54) BAKERY PRODUCT WITH WHITE CHOCOLATE COMPRISING FIBRE

(75) Inventors: Michel Lopez, Meulan (FR); An Parrein, Lebbeke-Wieze (BE); Valentine Detalle, Meulan (FR)

(73) Assignee: Barry Callebaut AG, Zurich (CH)

(*) Notice: Subject to any disclaimer, the term of this patent is extended or adjusted under 35 U.S.C. 154(b) by 164 days.

(21) Appl. No.: 12/744,097

(22) PCT Filed: Nov. 25, 2008

(86) PCT No.: PCT/EP2008/009992
§ 371 (c)(1),
(2), (4) Date: Aug. 4, 2010

(87) PCT Pub. No.: WO2009/068248
PCT Pub. Date: Jun. 4, 2009

(65) Prior Publication Data
US 2010/0303996 A1  Dec. 2, 2010

(30) Foreign Application Priority Data
Nov. 27, 2007  (GB) .................................. 0723182.2

(51) Int. Cl.
A23D 7/00 (2006.01)
A23C 3/00 (2006.01)
A23G 3/00 (2006.01)
A21D 2/18 (2006.01)
A21D 2/36 (2006.01)
A23G 1/30 (2006.01)
A23G 1/40 (2006.01)
A23G 1/50 (2006.01)
A23G 1/54 (2006.01)

(52) U.S. Cl.
CPC ........ A21D 2/18 (2013.01); A21D 2/364 (2013.01); A23G 1/305 (2013.01); A23G 1/40 (2013.01); A23G 1/50 (2013.01); A23G 1/54 (2013.01)
USPC ............................. 426/601; 426/523; 426/658

(58) Field of Classification Search
CPC ........... A21D 2/18; A21D 2/364; A23G 1/54; A23G 1/40; A23G 1/50; A23G 1/305
USPC .......................................... 426/601, 523, 658
See application file for complete search history.

(56) References Cited

U.S. PATENT DOCUMENTS

| 4,722,849 | A |   | 2/1988 | Dartey et al. |
| 4,732,767 | A |   | 3/1988 | Seiden et al. |
| 5,171,599 | A |   | 12/1992 | Weber |
| 5,344,664 | A | * | 9/1994 | Fitch et al. .................... 426/631 |
| 5,484,622 | A |   | 1/1996 | Caden et al. |
| 6,423,358 | B1 | * | 7/2002 | Barndt et al. ................. 426/548 |
| 7,153,531 | B2 |   | 12/2006 | Engleson et al. |
| 2003/0026890 | A1 | * | 2/2003 | Freeman et al. .............. 426/658 |
| 2003/0129276 | A1 |   | 7/2003 | Hansen et al. |
| 2004/0219272 | A1 |   | 11/2004 | Kraklow et al. |
| 2005/0158447 | A1 |   | 7/2005 | Minamigawa et al. |
| 2005/0266135 | A1 | * | 12/2005 | Silver ............................ 426/548 |
| 2005/0271785 | A1 |   | 12/2005 | Hayes-Jacobson et al. |
| 2006/0008576 | A1 |   | 1/2006 | Buck et al. |
| 2006/0040035 | A1 |   | 2/2006 | Thompson |
| 2006/0088636 | A1 | * | 4/2006 | Goldman ...................... 426/548 |
| 2006/0159830 | A1 |   | 7/2006 | Kawabata et al. |
| 2006/0286272 | A1 |   | 12/2006 | Hanselmann |
| 2007/0031562 | A1 |   | 2/2007 | Atwell et al. |

FOREIGN PATENT DOCUMENTS

| BE | 1004546 | 12/1992 |
| EP | 0599830 | 3/1996 |
| EP | 0666716 | 12/1998 |
| EP | 1358804 | 11/2003 |
| EP | 1652436 | 5/2006 |
| JP | 2000-189057 | 7/2000 |
| WO | WO 93/02566 | 2/1993 |
| WO | WO 9302566 A1 * | 2/1993 |
| WO | WO 93/06737 | 4/1993 |
| WO | WO 99/53769 | 10/1999 |
| WO | WO 00/40101 | 7/2000 |
| WO | WO 03/020043 | 3/2003 |
| WO | WO 2007/059644 | 3/2007 |
| WO | WO 2007059644 A1 * | 5/2007 |
| WO | WO 2008/141770 | 11/2008 |
| WO | WO 2009/012929 | 1/2009 |
| WO | WO 2009/027039 | 3/2009 |

OTHER PUBLICATIONS

Database WPI Week 2000, Thomson Scientific, London GB; AN 2000-551625; XP 002521483 (JP 2000-189057).

* cited by examiner

Primary Examiner — Humera Sheikh
Assistant Examiner — Subbalakshmi Prakash
(74) Attorney, Agent, or Firm — Hoxie & Associates LLC

(57) ABSTRACT

A bakery product comprises white chocolate in the form of one or more discrete pieces, wherein the white chocolate comprises an effective amount of fiber to reduce shape deformation and/or browning of the white chocolate during the production of the bakery product.

7 Claims, No Drawings

BAKERY PRODUCT WITH WHITE CHOCOLATE COMPRISING FIBRE

CROSS REFERENCE TO RELATED APPLICATIONS

This application is a United States Application under 35 U.S.C. 371 claiming benefit of PCT Application No. PCT/EP2008/009992, filed on Nov. 25, 2008, which claims the benefit of Great Britain Application No. 0723182.2, filed on Nov. 27, 2007 the contents of each of which are incorporated herein by reference.

The present invention relates to an unbaked bakery product comprising white chocolate in the form of one or more discrete pieces, a bakery product prepared from the unbaked bakery product, white chocolate for use in the unbaked bakery product and bakery product and to processes for producing the same.

It is common practice to include white chocolate chips in cookie dough or other bakery products, which remain as discrete particles in the cookie or the bakery product after baking. Unfortunately, the presence of the chips has undesirable effects on the resulting bakery product. For example, during baking, white chocolate chips generally burn and form a brown colour. This colour detracts from the desirability of the product. Furthermore, the chocolate chips tend to deform and spread out such that chocolate chip material migrates into the dough during processing and baking. There is a desire amongst manufacturers to reduce these adverse effects and to make the resulting bakery products more aesthetically pleasing.

US Patent Application No. 2005/0158447 discloses a process for producing confectionery highly stable to heat which can be eaten without being deformed, becoming sticky at the surface, or sticking to each other while maintaining the original mouthfeel of the product. The process comprises making the surface of a refined chocolate paste absorb moisture or bringing chocolate into contact with a moisture-absorbing food material, and then baking the resultant material.

EP-A-1652436 relates to a solid, low calorie, palatable sugar substitute comprising the following ingredients, by weight: 21.6-48.3% inulin; 21.6-59.0% polydextrose; and 2.0-48.0% maltodextrin. The sugar substitute is used to produce low calorie milk and dark chocolate.

WO 93/02566 discloses reduced calorie milk and dark chocolate confectionery compositions in which the sugar is wholly or partially replaced by a product selected from the group consisting of inulin, linear fructo-oligosaccharides, branched fructo-oligosaccharides or a mixture thereof.

U.S. Pat. No. 5,171,599 relates to a cookie dough composition that has a low water activity. The cookie dough can contain colour agent-containing edible particles. The invention is concerned with preventing colour bleeding from the colour agent-containing edible particles into the dough and does not describe modification of the composition of the colour agent-containing edible particles.

WO 00/40101 discloses a dietetic chocolate composition in which the sucrose sweetener or bulk sweeteners are partially or wholly replaced by a bulk sweetening composition.

WO 2007/059644 relates to chocolate composition in which at least 30% by weight of the sucrose content of regular chocolate is replaced by a combination of dietary fibres.

Although progress has been made in the art to reduce the shape deformation of milk and dark chocolate chips in bakery products, there is still a need to reduce the adverse effects mentioned above for white chocolate chips.

According to the first aspect of the invention, there is provided an unbaked bakery product comprising white chocolate in the form of one or more discrete pieces, wherein the white chocolate comprises an effective amount of fibre to reduce shape deformation and/or browning of the white chocolate in a bakery product prepared from the unbaked bakery product.

In a second aspect, there is provided a bakery product prepared from the unbaked bakery product according to the first aspect of the invention.

In a third aspect of the invention, there is provided white chocolate for use in an unbaked bakery product or a bakery product prepared from the unbaked bakery product. The white chocolate is as defined in the first aspect of the invention and may be used to produce the unbaked bakery product and the bakery product according to the first and second aspects, respectively.

In a fourth aspect, there is provided a process for preparing white chocolate according to the third aspect of the invention. Thus, there is provided a process for preparing white chocolate for use in the unbaked bakery product according to the first aspect of the invention. The process comprises:

(i) forming a mixture comprising components of the white chocolate;
(ii) refining the mixture; and
(iii) conching the mixture to form the white chocolate.

In a fifth aspect, the invention provides a process for preparing an unbaked bakery product according to the first aspect of the invention or a bakery product according to the second aspect of the invention comprising contacting white chocolate according to the third aspect of the invention with one or more of the remaining components of the unbaked bakery product.

In a sixth aspect of the invention, there is provided the use of fibre in white chocolate for reducing shape deformation and/or reducing browning of the white chocolate in a bakery product prepared from an unbaked bakery product that comprises the white chocolate in the form of one or more discrete pieces.

The invention relates to an unbaked bakery product. The unbaked bakery product includes any product that is usually baked prior to consumption, for example, dough or an oat based product, such as unbaked flapjack.

In a preferred embodiment, the unbaked bakery product is dough. Dough is well known in the food industry and generally refers to a flour based paste, which has not yet been hardened by heat. The flour may be derived from any cereal (grain), leguminous crop or mixture thereof and is mixed with a liquid, which is generally water. The dough typically comprises one or more other ingredients, such as leavening agents, shortening, sugar, salt, eggs, and optionally various flavouring and/or colouring materials, which are used to make bakery products.

The unbaked bakery product of the invention may be in any form, for example, fresh, frozen or par-baked.

The unbaked bakery product comprises white chocolate. The white chocolate comprises an effective amount of fibre to reduce shape deformation and/or browning of the white chocolate in a bakery product prepared from the unbaked bakery product.

The term "white chocolate" as used herein refers both to white chocolate and to white chocolate-like materials in which at least a part or all of the cocoa butter in white chocolate is replaced by another fat, typically selected from the group consisting of cocoa butter equivalents, butter fat or fractions thereof, palm oil or fractions thereof, coconut or fractions thereof, palm kernel oil or fractions thereof, rapeseed oil (optionally hardened) or fractions thereof, and mixtures thereof. White chocolate will typically have been produced in a chocolate making process which comprises a step of conching. White chocolate typically comprises sugar, milk solids and cocoa butter.

The white chocolate for use in the unbaked bakery product is in the form of one or more discrete pieces, e.g., white chocolate chips, chunks, or sticks. White chocolate chips or chunks may be of any shape, such as teardrop shaped, substantially spherical or substantially cuboid. White chocolate sticks refer to elongate pieces of white chocolate (i.e., having one dimension substantially larger than the other two), which may have a cross-section of any shape but is typically substantially spherical or substantially oblong.

The one or more discrete pieces of white chocolate may be of any suitable size. For example, they may be sized so as to provide from 1000 to 150,000 pieces per kg, wherein the pieces are preferably of substantially uniform size.

Typically, at least 50% by weight, more preferably at least 75% by weight of the pieces of white chocolate will have a volume of less than 1 cm$^3$, preferably less than 0.8 cm$^3$, such as less than 0.5 cm$^3$, more preferably less than 0.4 cm$^3$. Most preferably, at least 50% by weight, more preferably at least 75% by weight of the pieces of white chocolate will have a volume of from 0.005 to 0.8 cm$^3$, even more preferably from 0.007 to 0.5 cm$^3$, such as from 0.01 to 0.3 cm$^3$ or from 0.01 to 0.15 cm$^3$.

Preferably, the pieces of white chocolate have a largest dimension of less than 1.5 cm, such as less than 1.25 cm or less than 1 cm. Preferably the largest dimension is from 0.2 to 1.5 cm, such as from 0.3 to 1 cm or from 0.4 to 0.8 cm. The minimum dimension is preferably greater than 0.1 cm.

In one embodiment, the pieces of white chocolate are in the form of a round, flat-bottomed teardrop shape. They may be of any size but usually have a diameter of around 1 cm, such as from 0.5 cm to 1.5 cm or from 0.75 to 1.25 cm.

When the white chocolate is in the form of white chocolate sticks, the sticks may have different sizes (e.g., volumes) or dimensions as mentioned above. For example, white chocolate sticks may have a largest dimension of less than 30 cm, such as less than 15 cm, less than 12 cm or less than 10 cm. In a particular embodiment, white chocolate sticks may have a largest dimension of from 2 to 12 cm, such as from 4 to 10 cm or from 6 to 8 cm and/or a minimum dimension of more than 0.1 cm and/or a volume of from 0.15 to 30 cm$^3$, such as from 2 to 20 cm$^3$, more preferably from 4 to 15 cm$^3$, such as from 6 to 10 cm$^3$ or from 6 to 8 cm$^3$.

It will be appreciated by a person skilled in the art that the white chocolate for use in the unbaked bakery product according to the first aspect of the invention may be packaged and sold in the form of one or more discrete pieces (e.g., as chips, chunks or sticks) which are already of a suitable size for direct use in the unbaked bakery product. Alternatively the white chocolate may be packaged and sold in the form of a brick, bar or the like, which is first converted into one or more discrete pieces (for example, chips, chunks or sticks), prior to use in the unbaked bakery product. For example, the white chocolate may be sold and packaged in the form of a stick which has a volume of from 20 to 300 cm$^3$, such as from 30 to 200 cm$^3$ or from 50 to 150 cm$^3$ or from 60 to 100 cm$^3$ and/or a largest dimension of from 5 to 80 cm, such as from 20 to 60 cm or from 30 to 50 cm or from 35 to 40 cm and/or a minimum dimension of more than 0.5 cm, such as more than 1 cm or more than 4 cm.

Preferably, fibre represents from 15 to 50% by weight, most preferably from 20 to 40% by weight, even more preferably from 25 to 35% by weight of the white chocolate.

Suitable fibres for use in the white chocolate are non-starch polysaccharides. Preferred fibres may be selected from the group consisting of inulin, oligofructose, dextrin (e.g., maltodextrin, branched maltodextrin and mixtures thereof), polydextrose and mixtures thereof. Inulin is particularly preferred. In one embodiment, the white chocolate is substantially free of polydextrose (i.e., the white chocolate comprises less than 1% by weight, such as less than 0.5% by weight or less than 0.25% by weight polydextrose).

The white chocolate preferably comprises less than 33% by weight of fat, more preferably less than 30% by weight of fat. Most preferably, the white chocolate comprises from 25 to 29% by weight of fat. Preferably, the fat in the white chocolate is selected from the group consisting of cocoa butter, cocoa butter equivalents, butter fat or fractions thereof, palm oil or fractions thereof, coconut or fractions thereof, palm kernel oil or fractions thereof, liquid oils (for example, sunflower oil and/or rapeseed oil), interesterified mixtures of the above fats or fractions or hardened components thereof, or mixtures of one or more of these, such as a mixture of cocoa butter and a palm oil fraction.

Preferably, the white chocolate comprises from 3 to 10% by weight of a milk fat isolate, more preferably from 4 to 8% by weight of a milk fat isolate. The term "milk fat isolate" refers to the fat derived from milk that has been isolated from the remaining components of the milk, such as, for example, anhydrous milk fat.

When the white chocolate is a white chocolate-like material, the milk fat isolate may constitute a lower amount by weight, such as less than 3% by weight or less than 2% by weight of the chocolate-like material. For example, white chocolate-like material may comprise from 0.5 to 8% by weight or from 1.5 to 5% by weight or from 2 to 3% by weight milk fat isolate.

The white chocolate preferably comprises less than 11% by weight of whole milk powder. Most preferably, the white chocolate comprises from 6 to 10% by weight of whole milk powder.

In a preferred embodiment, the weight ratio of milk fat isolate to the fat derived from the whole milk powder in the white chocolate is at least 1:1, more preferably at least 3:2, most preferably from 2:1 to 7:2.

The total milk fat content of the white chocolate is preferably from 2 to 20% by weight, more preferably from 4 to 15% by weight, most preferably from 6 to 11% by weight of the white chocolate. The total milk fat is typically derived from the milk fat isolate and the fat derived from the whole milk powder.

Preferably, the total milk fat content of the white chocolate represents at least 20% by weight of the total fat content of the white chocolate, more preferably at least 22% by weight. Most preferably, the total milk fat content represents from 25 to 33% by weight of the total fat content of the white chocolate, such as from 27 to 31% by weight of the total fat content of the white chocolate.

Milk fat preferably represents a higher proportion of the total fat content of the white chocolate compared to conventional white chocolate. Without wishing to be bound by theory, it is thought that the higher proportion of milk fat helps reduce browning of the white chocolate when subjected to heat.

The white chocolate preferably comprises less than 45% by weight of sugar, more preferably less than 40% by weight sugar. Most preferably, the white chocolate comprises from 25 to 35% by weight sugar.

Sugar may include glucose, fructose, or sucrose, or sugar replacers such as mannitol, isomaltitol, xylitol, isomalt, lactitol, hydrogenated starch hydrolysates (HSH, including maltitol syrups), high fructose corn syrup or any combination thereof. Sucrose is particularly preferred. Preferably, the white chocolate comprises at least 5% by weight, such as at least 10%, at least 15% or at least 20% by weight, of sucrose.

In one embodiment, the white chocolate is substantially free (i.e., comprises less than 10% by weight, such as less than 5% by weight or less than 1% by weight) of sugar replacers but comprises glucose, fructose, sucrose or a mixture thereof.

Preferably, the white chocolate comprises a stabiliser such as an emulsifier. For example, emulsifiers are generally present in the white chocolate in amounts of up to 3% by weight, more preferably up to 2% by weight, such as up to 1% by weight of the white chocolate.

Emulsifiers include, for example, lecithin derived from soya bean, safflower, corn; fractionated lecithins enriched with either phosphatidyl choline, phosphatidyl ethanolamine, phosphatidyl inositol; emulsifiers derived from oats, mono- and diglycerides and their tartaric esters, monosodium phosphate derivatives of mono- and diglycerides of edible fats and oils, sorbitan monostearate, sorbitan tristearate, sucrose esters, polyoxyethylene sorbitan monostearate, hydroxylated lecithin, synthetic phospholipids such as ammonium phosphatides, lactylated fatty acid esters of glycerol and propylene glycol, polyglycerol esters of fatty acids, propylene glycol mono- and diesters of fats and fatty acids. Lecithin is particularly preferred.

The white chocolate optionally comprises one or more flavourings such as vanilla flavourings. Those skilled in the art are familiar with numerous flavourings than can be selected for use in this invention.

The white chocolate preferably comprises a source of added calcium, separate from that present in any other components (including the whole milk powder), such as a calcium salt. Preferably, the compositions comprise from 0.1 to 6% by weight, more preferably from 0.5 to 5% by weight, such as from 1 to 4.5% by weight most preferably from 2 to 4% by weight of a calcium source. Preferred calcium sources are selected from the group consisting of calcium carbonate, dairy calcium and mixtures thereof. Calcium offers benefits for colour and/or texture.

In one embodiment, the white chocolate comprises citric acid in an amount of less than 2% by weight, preferably less than 1.5% by weight, such as less than 1% by weight (e.g., from 0.1 to 0.8% by weight or from 0.3 to 0.5% by weight).

The white chocolate of the invention may comprise one or more optional components, such as, for example, sodium carbonate, preferably in an amount of up to 1% by weight.

The present invention also provides a bakery product prepared from the unbaked bakery product according to the first aspect of the invention. Thus, in one embodiment, the invention provides a bakery product comprising white chocolate in the form of one or more discrete pieces, wherein the white chocolate comprises an effective amount of fibre to reduce shape deformation and/or browning of the white chocolate during the production of the bakery product.

The bakery product is preferably selected from the group consisting of biscuits (e.g., cookies and shortbread), doughnuts, muffins, brownies, cakes (e.g., sponge cakes), pastries, chocolate croissants, waffles, pies, tarts, granola bars, bread (e.g., brioche and pannetone) and flapjack. Cookies are particularly preferred.

The bakery product is prepared by subjecting the unbaked bakery product to heat, typically in an oven, using methods well-known in the art. It will be appreciated by those skilled in the art that baking times and temperatures will vary for different unbaked bakery product formulations, size of the bakery product and oven types. For example, in the preparation of a cookie, commercial cookie baking times may vary from about 5 minutes to about 20 minutes, such as from 8 to 12 minutes (e.g., about 10 minutes) and the oven baking temperature may vary from about 120° C. to about 350° C., such as from 160 to 180° C. (e.g., about 170° C.). For softer bakery products such as bread (e.g., brioche) or pastries, baking times are typically longer and may vary from 5 to 60 minutes, such as from 10 to 50 minutes or from 15 to 40 minutes or from 20 to 30 minutes. The oven baking temperatures for such bakery products may vary from about 120° C. to about 350° C., such as from 170° C. to 250° C. or from 180° C. to 220° C.

The relative humidity of the oven during baking preferably ranges from 1 to 20%. For example, when baking biscuit dough (e.g., cookie dough) the relative humidity typically ranges from 1 to 10%, such as from 2 to 8% or from 3 to 5%. For softer bakery products such as bread (e.g., brioche), pastries or cakes (e.g., sponge cake), the relative humidity typically ranges from 5 to 20%, such as from 8 to 15% or from 10 to 15%.

The white chocolate according to the fourth aspect of the invention may be prepared by a process comprising:
 (i) forming a mixture comprising components of the white chocolate;
 (ii) refining the mixture; and
 (iii) conching the mixture to form the white chocolate.

In the process for preparing the white chocolate, step (i) involves the formation of a mixture comprising components of the white chocolate. The mixture may comprise part or all of the components of the product. By "part of the components", it is meant that not all of the components of the final product are present i.e., not all of the components of the final product may have been included and/or the components may not have been added in the amounts that are present in the final product. For example, preferably a portion of the fat component (e.g., butter fat) is omitted from the mixture in step (i) and added at a later stage of the process (preferably before and/or during step (iii)).

Step (ii) involves refining the mixture using refining means. The term "refining", as used herein is well-known to those skilled in the art and refers to a step of particle size reduction. The term "refining" may be synonymous with milling. The refining step may be carried out using a ball mill or roll refiner, such as a roll refiner (e.g., a 5 roll refiner).

In a preferred embodiment, the refining step is carried out at elevated temperatures (i.e., above room temperature), such as at a temperature of from 25 to 60° C., more preferably from 30 to 55° C., most preferably from 40 to 50° C.

In step (iii), the refined mixtures are subjected to a conching step. The term "conching", as used herein, will be understood by those skilled in the art and refers to a flavour-developing step which involves the intimate mixing or kneading of the chocolate ingredients, typically at elevated temperatures.

The process for preparing the white chocolate may comprise one or more further steps in addition to (i) to (iii). For example, after conching, the white chocolate is optionally tempered before being cooled.

In the process according to the fifth aspect of the invention, the term "contacting" encompasses admixing white chocolate in the form of one or more discrete pieces with one or more of the remaining components of the unbaked bakery product and/or sprinkling white chocolate in the form of one or more discrete pieces onto a surface of the unbaked bakery product. Thus, in one embodiment, discrete pieces of the white chocolate may be either partially or fully embedded in the unbaked bakery product or the bakery product prepared from the unbaked bakery product. Partially embedded pieces of white chocolate have an exposed surface that is not surrounded by a portion of the unbaked or baked bakery product.

The invention also contemplates the use of fibre in white chocolate for reducing shape deformation and/or browning of the white chocolate in a bakery product prepared from an unbaked bakery product that comprises the white chocolate in the form of one or more discrete pieces. The unbaked bakery product, the bakery product and the white chocolate are preferably as described above in relation to the first, second and third aspects, respectively. Suitable fibres include non-starch polysaccharides. Preferred fibres may be selected from the group consisting of inulin, oligofructose, dextrin (e.g., maltodextrin, branched maltodextrin and mixtures thereof), polydextrose and mixtures thereof. Inulin is particularly preferred.

The listing or discussion of an apparently prior-published document in this specification should not necessarily be taken as an acknowledgement that the document is part of the state of the art or is common general knowledge.

The following non-limiting examples illustrate the invention and do not limit its scope in any way. In the examples and throughout this specification, all percentages, parts and ratios are by weight unless indicated otherwise. It will be appreciated that the various percentage amounts of the different components that are present in the products of the invention, including any optional components, will add up to 100%.

EXAMPLES

Example 1

Two types of cookies were made: The first type were made from dough containing standard white chocolate chips and the second type were made from dough containing white chocolate chips according to the invention.

The two types of white chocolate had the following compositions (by weight).

| Ingredient | Standard white chocolate chips | White chocolate chips of invention |
| --- | --- | --- |
| Cocoa butter | 23 | 20.5 |
| Sugar | 62 | 32.5 |
| Fibre (inulin) | 0 | 32 |
| Whole milk powder | 12.5 | 8.5 |
| Milk fat isolate | 2 | 6 |
| Lecithin | 0.5 | 0.5 |
| Vanillin | + | + |
| Total fat | 28.5 | 28.5 |
| Total Milk fat | 5.3 | 8.3 |

Observations:

During baking, the standard white chocolate chips burnt and the shape of the chips deformed and spread out. In contrast, the white chocolate chips according to the invention remained white and shape deformation was significantly reduced.

Example 2

White chocolate is made having the following composition (by weight).

| Ingredient | White chocolate |
| --- | --- |
| Cocoa butter | 20.5 |
| Sugar | 37.5 |
| Fibre (inulin) | 27.5 |
| Whole milk powder | 4.5 |
| Milk fat isolate | 6 |
| Lecithin | 0.5 |
| Calcium carbonate | 3.5 |
| Total fat | 28.5 |
| Total Milk fat | 7.2 |

The invention claimed is:

1. An unbaked bakery product comprising white chocolate in the form of one or more discrete pieces, wherein the white chocolate comprises cocoa butter, milk solids wherein the milk solids comprise milk fat, from 25%-45% by weight of sugar, and from 15% to 50% by weight fiber, wherein the fiber is inulin, and wherein the total milk fat content of the white chocolate is from 6 to 20% by weight and the total milk fat content of the white chocolate represents at least 20% by weight of the total fat content of the white chocolate, wherein the white chocolate comprises less than 11% by weight of whole milk powder, wherein the whole milk powder comprises milk fat, and wherein the weight ratio of milk fat isolate to the fat derived from the whole milk powder is at least 1:1, and wherein the amount of inulin is an effective amount to reduce shape deformation and/or browning of the white chocolate in a bakery product prepared from the unbaked bakery product and wherein the shape deformation and/or browning is reduced compared to an unbaked bakery product comprising white chocolate in the form of discrete pieces which does not contain inulin.

2. Unbaked bakery product according to claim 1, wherein the white chocolate comprises less than 33% by weight of fat.

3. Unbaked bakery product according to claim 1, wherein the white chocolate comprises from 3 to 10% by weight of a milk fat isolate.

4. Unbaked bakery product according to claim 1, wherein the white chocolate comprises from 32% to 45% by weight of sugar.

5. A bakery product prepared from the unbaked bakery product according to claim 1.

6. A bakery product according to claim 5 selected from the group consisting of cookies, shortbread, doughnuts, muffins, brownies, cakes, pastries, waffles, pies, tarts, granola bars, bread and flapjack.

7. Unbaked bakery product according to claim 1, wherein the total milk fat content of the white chocolate represents from 25 to 33% by weight of the total fat content of the white chocolate.

* * * * *